(12) United States Patent
Chun et al.

(10) Patent No.: US 8,811,336 B2
(45) Date of Patent: Aug. 19, 2014

(54) METHOD OF PERFORMING HANDOVER AND CONTROLLING THEREOF IN A MOBILE COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 702 days.

(21) Appl. No.: 12/438,523

(22) PCT Filed: Aug. 22, 2007

(86) PCT No.: PCT/KR2007/004011
§ 371 (c)(1),
(2), (4) Date: Jul. 19, 2010

(87) PCT Pub. No.: WO2008/023927
PCT Pub. Date: Feb. 28, 2008

(65) Prior Publication Data
US 2010/0278143 A1 Nov. 4, 2010

Related U.S. Application Data

(60) Provisional application No. 60/823,247, filed on Aug. 22, 2006, provisional application No. 60/863,545, filed on Oct. 30, 2006, provisional application No. 60/915,042, filed on Apr. 30, 2007, provisional application No. 60/915,417, filed on May 1, 2007, provisional application No. 60/915,666, filed on May 2, 2007, provisional application No. 60/944,785, filed on Jun. 18, 2007.

(30) Foreign Application Priority Data
Aug. 13, 2007 (KR) .................. 10-2007-0081356

(51) Int. Cl.
*H04W 36/00* (2009.01)

(52) U.S. Cl.
CPC ............................... *H04W 36/0033* (2013.01)
USPC ............................................. 370/331

(58) Field of Classification Search
USPC .................. 370/311, 331, 332, 333, 334; 455/343.1, 343.2, 343.4, 436, 438
See application file for complete search history.

(56) References Cited

U.S. PATENT DOCUMENTS

| | | | |
|---|---|---|---|
| 4,205,200 A | 5/1980 | Parikh et al. | |
| 5,588,009 A | 12/1996 | Will | |
| 5,894,595 A | 4/1999 | Foladare et al. | |
| 6,157,833 A | 12/2000 | Lawson-Jenkins et al. | |
| 6,233,430 B1 | 5/2001 | Helferich | |
| 6,324,171 B1 | 11/2001 | Lee et al. | |
| 6,353,628 B1 | 3/2002 | Wallace et al. | |
| 6,526,027 B1 | 2/2003 | Yeom | |
| 6,725,267 B1 | 4/2004 | Hoang | |
| 6,785,256 B2 * | 8/2004 | O'Neill | 370/338 |
| 6,795,419 B2 | 9/2004 | Parantainen et al. | |
| 7,039,425 B1 | 5/2006 | Mazawa et al. | |
| 7,197,317 B2 | 3/2007 | Parkvall et al. | |
| 7,245,707 B1 | 7/2007 | Chan | |
| 7,373,148 B2 | 5/2008 | Kim et al. | |
| 7,443,813 B2 | 10/2008 | Hwang et al. | |
| 7,457,588 B2 | 11/2008 | Love et al. | |
| 7,525,908 B2 | 4/2009 | Olsson et al. | |
| 7,551,643 B2 | 6/2009 | Yeo et al. | |
| 7,606,370 B2 | 10/2009 | Lillie et al. | |
| 7,680,058 B2 | 3/2010 | Seurre et al. | |
| 7,769,351 B2 | 8/2010 | Kwak et al. | |
| 7,801,527 B2 | 9/2010 | Putcha | |
| 7,864,731 B2 | 1/2011 | Forsberg | |
| 7,899,451 B2 | 3/2011 | Hu et al. | |
| 7,912,471 B2 | 3/2011 | Kodikara Patabandi et al. | |
| 7,916,697 B2 * | 3/2011 | Eklund | 370/331 |
| 7,958,542 B2 | 6/2011 | Herrmann | |
| 8,064,676 B2 | 11/2011 | Li et al. | |
| 8,427,997 B2 | 4/2013 | Ren et al. | |
| 8,582,482 B2 | 11/2013 | Hsu | |
| 8,582,487 B2 | 11/2013 | Gou et al. | |
| 8,588,100 B2 | 11/2013 | Wei | |
| 8,614,971 B2 | 12/2013 | Kim et al. | |
| 2001/0012787 A1 | 8/2001 | Wortham | |
| 2001/0017850 A1 | 8/2001 | Kalliokulju et al. | |

| | | |
|---|---|---|
| 2001/0034791 A1 | 10/2001 | Clubb et al. |
| 2001/0044322 A1 | 11/2001 | Raaf |
| 2002/0024972 A1 | 2/2002 | Yi et al. |
| 2002/0028690 A1 | 3/2002 | McKenna et al. |
| 2002/0057663 A1 | 5/2002 | Lim |
| 2002/0059464 A1 | 5/2002 | Hata et al. |
| 2002/0091860 A1 | 7/2002 | Kalliokulju et al. |
| 2002/0114294 A1 | 8/2002 | Toskala et al. |
| 2003/0007490 A1 | 1/2003 | Yi et al. |
| 2003/0007512 A1 | 1/2003 | Tourunen et al. |
| 2003/0016698 A1 | 1/2003 | Chang et al. |
| 2003/0050078 A1 | 3/2003 | Motegi et al. |
| 2003/0119488 A1 | 6/2003 | Hans et al. |
| 2003/0123485 A1 | 7/2003 | Yi et al. |
| 2003/0125056 A1 | 7/2003 | Jiang |
| 2003/0139170 A1 | 7/2003 | Heo |
| 2003/0147371 A1 | 8/2003 | Choi et al. |
| 2003/0165122 A1 | 9/2003 | Westphal |
| 2003/0165133 A1 | 9/2003 | Garani |
| 2003/0189922 A1 | 10/2003 | Howe |
| 2003/0207696 A1 | 11/2003 | Willenegger et al. |
| 2003/0223452 A1 | 12/2003 | Toskala et al. |
| 2003/0227875 A1 | 12/2003 | Wei et al. |
| 2004/0014452 A1 | 1/2004 | Lim et al. |
| 2004/0028078 A1 | 2/2004 | Beckmann et al. |
| 2004/0039830 A1 | 2/2004 | Zhang et al. |
| 2004/0042507 A1 | 3/2004 | Pelletier et al. |
| 2004/0087320 A1 | 5/2004 | Kim et al. |
| 2004/0100940 A1 | 5/2004 | Kuure et al. |
| 2004/0117860 A1 | 6/2004 | Yi et al. |
| 2004/0121771 A1 | 6/2004 | Song et al. |
| 2004/0147269 A1 | 7/2004 | Kim |
| 2004/0148427 A1 | 7/2004 | Nakhjiri et al. |
| 2004/0176112 A1 | 9/2004 | Beckmann et al. |
| 2004/0180675 A1 | 9/2004 | Choi et al. |
| 2004/0185837 A1 | 9/2004 | Kim et al. |
| 2004/0202107 A1* | 10/2004 | Bensimon et al. ............ 370/229 |
| 2004/0229605 A1 | 11/2004 | Hwang et al. |
| 2004/0233870 A1 | 11/2004 | Willenegger et al. |
| 2004/0242195 A1 | 12/2004 | Chun et al. |
| 2004/0253959 A1 | 12/2004 | Hwang et al. |
| 2005/0009527 A1 | 1/2005 | Sharma |
| 2005/0018624 A1 | 1/2005 | Meier et al. |
| 2005/0032555 A1 | 2/2005 | Jami et al. |
| 2005/0037767 A1 | 2/2005 | Kim et al. |
| 2005/0041610 A1 | 2/2005 | Lee et al. |
| 2005/0041681 A1 | 2/2005 | Lee et al. |
| 2005/0053029 A1 | 3/2005 | Lee et al. |
| 2005/0063347 A1 | 3/2005 | Sarkkinen et al. |
| 2005/0070253 A1 | 3/2005 | Farnsworth et al. |
| 2005/0085254 A1 | 4/2005 | Chuah et al. |
| 2005/0094670 A1 | 5/2005 | Kim |
| 2005/0100048 A1 | 5/2005 | Chun et al. |
| 2005/0141462 A1 | 6/2005 | Aerrabotu et al. |
| 2005/0141471 A1 | 6/2005 | Virtanen et al. |
| 2005/0141538 A1 | 6/2005 | Beckmann et al. |
| 2005/0141541 A1 | 6/2005 | Cuny et al. |
| 2005/0160184 A1 | 7/2005 | Walsh et al. |
| 2005/0164719 A1 | 7/2005 | Waters |
| 2005/0176430 A1 | 8/2005 | Lee et al. |
| 2005/0176474 A1 | 8/2005 | Lee et al. |
| 2005/0185620 A1 | 8/2005 | Lee et al. |
| 2005/0232271 A1 | 10/2005 | Kettunen et al. |
| 2005/0238051 A1 | 10/2005 | Yi et al. |
| 2005/0249188 A1 | 11/2005 | Hayashi |
| 2005/0265294 A1 | 12/2005 | Hu et al. |
| 2005/0286470 A1 | 12/2005 | Asthana et al. |
| 2005/0288022 A1 | 12/2005 | Ryu et al. |
| 2006/0013165 A1 | 1/2006 | Choi et al. |
| 2006/0034335 A1 | 2/2006 | Karaoguz et al. |
| 2006/0039309 A1 | 2/2006 | Lee et al. |
| 2006/0067324 A1 | 3/2006 | Kim et al. |
| 2006/0067364 A1 | 3/2006 | Jung et al. |
| 2006/0087994 A1 | 4/2006 | Barth et al. |
| 2006/0098567 A1 | 5/2006 | Willenegger et al. |
| 2006/0098688 A1 | 5/2006 | Parkvall et al. |
| 2006/0126554 A1 | 6/2006 | Motegi et al. |
| 2006/0126570 A1 | 6/2006 | Kim et al. |
| 2006/0142019 A1 | 6/2006 | Kroth et al. |
| 2006/0165045 A1 | 7/2006 | Kim et al. |
| 2006/0187846 A1 | 8/2006 | Pelletier et al. |
| 2006/0195540 A1 | 8/2006 | Hamilton et al. |
| 2006/0203760 A1 | 9/2006 | Fukui et al. |
| 2006/0209870 A1 | 9/2006 | Lee et al. |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0041349 A1 | 2/2007 | Kim et al. |
| 2007/0041382 A1 | 2/2007 | Vayanos et al. |
| 2007/0047452 A1 | 3/2007 | Lohr et al. |
| 2007/0047493 A1 | 3/2007 | Park et al. |
| 2007/0047582 A1 | 3/2007 | Malkamaki |
| 2007/0060139 A1 | 3/2007 | Kim et al. |
| 2007/0064631 A1 | 3/2007 | Tseng et al. |
| 2007/0064665 A1 | 3/2007 | Zhang et al. |
| 2007/0155389 A1 | 7/2007 | Zhang |
| 2007/0155390 A1 | 7/2007 | Kodikara Patabandi et al. |
| 2007/0165567 A1 | 7/2007 | Tan et al. |
| 2007/0165635 A1 | 7/2007 | Zhang et al. |
| 2007/0177569 A1 | 8/2007 | Lundby |
| 2007/0178875 A1 | 8/2007 | Rao et al. |
| 2007/0206531 A1 | 9/2007 | Pajukoski et al. |
| 2007/0224993 A1* | 9/2007 | Forsberg ...................... 455/436 |
| 2007/0248075 A1 | 10/2007 | Liu et al. |
| 2007/0254679 A1 | 11/2007 | Montojo et al. |
| 2007/0258591 A1 | 11/2007 | Terry et al. |
| 2007/0291634 A1 | 12/2007 | Kwon et al. |
| 2007/0291646 A1 | 12/2007 | Ohishi et al. |
| 2007/0291673 A1 | 12/2007 | Demirhan et al. |
| 2007/0291695 A1* | 12/2007 | Sammour et al. ............. 370/331 |
| 2007/0291719 A1 | 12/2007 | Demirhan et al. |
| 2007/0291728 A1 | 12/2007 | Dalsgaard et al. |
| 2007/0291729 A1 | 12/2007 | Dalsgaard et al. |
| 2007/0291788 A1 | 12/2007 | Sammour et al. |
| 2007/0293224 A1* | 12/2007 | Wang et al. .................. 455/436 |
| 2008/0004058 A1 | 1/2008 | Jeong et al. |
| 2008/0009289 A1 | 1/2008 | Kashima et al. |
| 2008/0043619 A1 | 2/2008 | Sammour et al. |
| 2008/0056198 A1 | 3/2008 | Charpentier et al. |
| 2008/0056273 A1 | 3/2008 | Pelletier et al. |
| 2008/0064390 A1 | 3/2008 | Kim |
| 2008/0076359 A1 | 3/2008 | Charpentier et al. |
| 2008/0089285 A1 | 4/2008 | Pirskanen et al. |
| 2008/0089292 A1 | 4/2008 | Kitazoe et al. |
| 2008/0095185 A1 | 4/2008 | DiGirolamo et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0182594 A1 | 7/2008 | Flore et al. |
| 2008/0186946 A1 | 8/2008 | Marinier et al. |
| 2008/0188223 A1 | 8/2008 | Vesterinen et al. |
| 2008/0225744 A1 | 9/2008 | DiGirolamo et al. |
| 2008/0225765 A1 | 9/2008 | Marinier et al. |
| 2008/0240439 A1 | 10/2008 | Mukherjee et al. |
| 2008/0259912 A1 | 10/2008 | Wang et al. |
| 2008/0267126 A1 | 10/2008 | Vujcic et al. |
| 2008/0267405 A1 | 10/2008 | Vialen et al. |
| 2008/0268850 A1 | 10/2008 | Narasimha et al. |
| 2008/0273610 A1 | 11/2008 | Malladi et al. |
| 2008/0280567 A1 | 11/2008 | Sharma |
| 2008/0285691 A1 | 11/2008 | Onggosanusi et al. |
| 2008/0287091 A1 | 11/2008 | Suzuki et al. |
| 2008/0287129 A1 | 11/2008 | Somasundaram et al. |
| 2008/0310452 A1 | 12/2008 | Vedantham et al. |
| 2008/0316959 A1 | 12/2008 | Bachl et al. |
| 2009/0005051 A1 | 1/2009 | Voyer et al. |
| 2009/0022107 A1 | 1/2009 | Kapoor et al. |
| 2009/0034466 A1 | 2/2009 | Lindskog et al. |
| 2009/0040982 A1 | 2/2009 | Ho et al. |
| 2009/0086659 A1 | 4/2009 | Pani et al. |
| 2009/0086710 A1 | 4/2009 | Ho |
| 2009/0092076 A1 | 4/2009 | Zheng et al. |
| 2009/0109912 A1 | 4/2009 | DiGirolamo et al. |
| 2009/0124259 A1 | 5/2009 | Attar et al. |
| 2009/0143074 A1 | 6/2009 | Pelletier et al. |
| 2009/0163199 A1 | 6/2009 | Kazmi et al. |
| 2009/0175183 A1 | 7/2009 | Mochizuki et al. |

| | | | | | | |
|---|---|---|---|---|---|---|
| 2009/0181710 | A1 | 7/2009 | Pani et al. | KR | 1020040086950 | 10/2004 |
| 2009/0207771 | A1 | 8/2009 | Lindskog et al. | KR | 10-2005-0008440 | 1/2005 |
| 2009/0239538 | A1 | 9/2009 | Motegi et al. | KR | 10-2005-0019560 | 3/2005 |
| 2009/0264164 | A1 | 10/2009 | Chun et al. | KR | 1020050027972 A | 3/2005 |
| 2009/0318170 | A1 | 12/2009 | Lee et al. | KR | 1020050053376 | 6/2005 |
| 2010/0027413 | A1 | 2/2010 | Park et al. | KR | 1020050073244 | 7/2005 |
| 2010/0046384 | A1 | 2/2010 | Lee et al. | KR | 10-2005-0096763 | 10/2005 |
| 2010/0061285 | A1 | 3/2010 | Maeda et al. | KR | 10-2005-0100552 | 10/2005 |
| 2010/0061330 | A1 | 3/2010 | Hanov | KR | 10-2005-0100861 | 10/2005 |
| 2010/0067495 | A1 | 3/2010 | Lee et al. | KR | 10-2005-0106845 | 11/2005 |
| 2010/0075635 | A1 | 3/2010 | Lim et al. | KR | 10-2006-0024756 | 3/2006 |
| 2010/0128669 | A1 | 5/2010 | Chun et al. | KR | 1020060026722 | 3/2006 |
| 2010/0137016 | A1 | 6/2010 | Voyer | KR | 1020060048373 | 5/2006 |
| 2010/0165901 | A1 | 7/2010 | Kim | KR | 1020060073472 | 6/2006 |
| 2010/0195568 | A1 | 8/2010 | Iimori | RU | 2249917 | 4/2005 |
| 2010/0227614 | A1 | 9/2010 | Chun et al. | WO | 99/04584 | 1/1999 |
| 2010/0238799 | A1 | 9/2010 | Sebire | WO | 0074416 | 12/2000 |
| 2010/0238903 | A1 | 9/2010 | Kitazoe | WO | 0239622 | 5/2002 |
| 2010/0254340 | A1 | 10/2010 | Park et al. | WO | 02/091659 | 11/2002 |
| 2010/0265896 | A1 | 10/2010 | Park et al. | WO | 03/100988 | 12/2003 |
| 2010/0272004 | A1 | 10/2010 | Maeda et al. | WO | 2004/017581 | 2/2004 |
| 2010/0309877 | A1 | 12/2010 | Damnjanovic et al. | WO | 2004028050 | 4/2004 |
| 2011/0039536 | A1 | 2/2011 | Lee et al. | WO | 2004043094 | 5/2004 |
| 2011/0090836 | A1 | 4/2011 | Mochizuki et al. | WO | 2004-064272 | 7/2004 |
| 2011/0116436 | A1 | 5/2011 | Bachu et al. | WO | 2004/091246 | 10/2004 |
| 2011/0182243 | A1 | 7/2011 | Gallagher et al. | WO | 2004/102833 | 11/2004 |
| 2011/0207427 | A1 | 8/2011 | Kitani et al. | WO | 2005/048613 | 5/2005 |
| 2011/0261743 | A1 | 10/2011 | Futaki et al. | WO | 2005/067262 | 7/2005 |
| 2012/0002589 | A1 | 1/2012 | Saifullah et al. | WO | 2005/122616 | 12/2005 |
| | | | | WO | 2006000876 | 1/2006 |
| | | | | WO | 2006/018670 | 2/2006 |
| | | | | WO | 2006011763 | 2/2006 |

FOREIGN PATENT DOCUMENTS

| | | | | | |
|---|---|---|---|---|---|
| CN | 1549612 | 11/2004 | WO | 2006049441 | 5/2006 |
| CN | 1719932 | 1/2006 | WO | 2006/075820 | 7/2006 |
| CN | 1731887 | 2/2006 | WO | 2006/109851 | 10/2006 |
| CN | 1751460 | 3/2006 | WO | 2006104344 | 10/2006 |
| CN | 1835627 | 9/2006 | WO | 2006108703 | 10/2006 |
| EP | 0889664 | 1/1999 | WO | 2006/116620 | 11/2006 |
| EP | 1148753 A2 | 10/2001 | WO | 2007025138 | 3/2007 |
| EP | 1168877 | 1/2002 | WO | 2007052888 | 5/2007 |
| EP | 1209938 | 5/2002 | WO | 2007-078929 | 7/2007 |
| EP | 1304898 A1 | 4/2003 | WO | 2007078155 | 7/2007 |
| EP | 1315356 | 5/2003 | WO | 2007078172 | 7/2007 |
| EP | 1318632 | 6/2003 | WO | 2007/133034 A2 | 11/2007 |
| EP | 1337124 | 8/2003 | WO | 2008/042889 | 4/2008 |
| EP | 1372310 | 12/2003 | WO | 2008051466 | 5/2008 |
| EP | 1420551 | 5/2004 | WO | 2008/096984 | 8/2008 |
| EP | 1499144 | 1/2005 | WO | 2008111684 | 9/2008 |
| EP | 1501328 | 1/2005 | WO | 2009084998 | 7/2009 |
| EP | 1511245 | 3/2005 | | | |
| EP | 1720322 | 11/2006 | | | |
| EP | 1720373 | 11/2006 | | | |
| JP | 6006294 | 1/1994 | | | |
| JP | 2002-539686 | 11/2002 | | | |
| JP | 2003-504935 | 2/2003 | | | |
| JP | 2003087180 | 3/2003 | | | |
| JP | 2003196775 | 7/2003 | | | |
| JP | 2003235064 | 8/2003 | | | |
| JP | 2004-134904 | 4/2004 | | | |
| JP | 2005057787 | 3/2005 | | | |
| JP | 2005-260906 | 9/2005 | | | |
| JP | 2005-354488 | 12/2005 | | | |
| JP | 2006-505979 | 2/2006 | | | |
| JP | 2006-067115 | 3/2006 | | | |
| JP | 2006528456 | 12/2006 | | | |
| JP | 2007165635 | 6/2007 | | | |
| JP | 2008535370 | 8/2008 | | | |
| JP | 2009540721 | 11/2009 | | | |
| JP | 2009542100 | 11/2009 | | | |
| KR | 2001-0015234 | 2/2001 | | | |
| KR | 1020010105240 A | 11/2001 | | | |
| KR | 10-2002-0001173 | 1/2002 | | | |
| KR | 10-2002-0014939 | 2/2002 | | | |
| KR | 1020030026924 | 4/2003 | | | |
| KR | 1020030080165 | 10/2003 | | | |
| KR | 1020030093604 | 12/2003 | | | |
| KR | 10-2004-0039944 | 5/2004 | | | |
| KR | 1020040048675 A | 6/2004 | | | |
| KR | 10-2004-0072858 | 8/2004 | | | |

OTHER PUBLICATIONS

3rd Generation Partnership Project "Radio Interface Protocol Aspects" 3GPP TR 25.813, May 29, 2006.*

Ericsson "DRX and DTX in LTE_Active" Mar. 27, 2006.*

Ericsson, "MAC header for Improved L2 support for high data rates," R2-070810, 3GPP TSG-RAN WG2 #57, Feb. 2007, XP-050133836.

Alcatel-Lucent, "DL Control Signaling and Multiplexing for VOIP," R1-071721, 3GPP TSG RAN WG1 Meeting #48bis, Mar. 2007,XP-002460800.

Nokia Corporation et al., "MAC Header Format," R2-073891, 3GPP TSG-RAN WG2 Meeting #59bis, Oct. 2007, XP-002602993.

LG Electronics Inc., "Support for VoIP Over MAC-HS/EHS," R2-071542, 3GPP TSG-RAN WG2 #57bis, Mar. 2007, XP-050134474.

LG Electronics, "Discussion on Message 4 in Random Access", R2-070519, 3GPP TSG-RAN WG2 #57, Feb. 2007.

LG Electronics, "Discussion on Message 4 in Random Access", R2-071456, 3GPP TSG-RAN WG2 #57bis, Mar. 2007.

LG Electronics, "Discussion on Message 4 in Random Access", R2-071923, 3GPP TSG-RAN WG2 #58, May 2007.

LG Electronics Inc., "UL Timing Control Related to Contention Resolution," R2-081607, 3GPP TSG RAN WG2 #61bis, Mar. 2008, XP-050139334.

3rd Generation Partnership Project (3GPP), "Technical Specification Group Radio Access Network; Evolved Universal Terrestrial Radio Access (E-UTRA) Medium Access Control (MAC) Protocol Specification (Release 8)," 3GPP TS 36.321, v8.1.0, Mar. 2008, XP-050377617.
Sammour, M.; "Method and System for Enhancing Discontinuous Reception in Wireless Systems"; U.S. Appl. No. 60/863,185; Oct. 27, 2006.
3GPP TSG-RAN WG2 Meeting #56-bis, R2-070107—Requirements for redirection in E-UTRAN, (Nokia) Sorrento, Italy, Jan. 15-19, 2007.
IPWireless, Tdoc R2-052377; "Layer 2 Functions for LTE"; 3GPP TSG RAN WG2 #48bis; Cannes, France; Oct. 10, 2005.
Samsung Electronics Co., Ltd; Tdoc R2-070130; "Selective Forwarding/Rettransmission During HO"; 3GPP TSG-RAN2 #56bis; Sorrento, Italy; Jan. 15, 2007.
Samsung Electronics Co., Ltd; Tdoc R2-061829; "Re-use of PDCP SN at ARQ Level"; 3GPP TSG RAN2 #53bis; Cannes, France; Jun. 27, 2006.
Samsung, "LTE Random access procedure," R2-062258, 3GPP TSG RAN2#54, Aug. 2006.
IPWireless, "Contention Resolution in Non-synchronous RACH Access," R2-062269, RAN2#54, Aug. 2006.
Ericsson, "Initial Random Access Procedure for E-UTRAN," R2-062853, 3GPP TSG-RAN WG2 #55, Oct. 2006.
Siemens, "Initial Access Procedure," R2-061931, 3GPP TSG-RAN WG2 LTE AdHoc Meeting, Jun. 2006.
NTT DoCoMo, Inc., "MAC PDU Structure for LTE," 3GPP TSG RAN WG2 #56bis, R2-070280, Jan. 2007, XP-050133369.
Catt et al., "Enhancement to Buffer Status Reporting," 3GPP TSG-RAN WG2 #57bis, R2-071345, Mar. 2007, XP-050134291.
Panasonic, "MAC PDU Format for LTE," 3GPP TSG RAN WG2#56bis, Jan. 15, 2007, Doc. No. R2-070096.
LG Electronics Inc., "Relative Buffer Status Reporting," 3GPP TSG RAN WG2#46bis, Apr. 4, 2005, Doc. No. R2-050852.
LG Electronics Inc., "Contents of PDCP Status Report," R2-07xxxx, 3GPP TSG-RAN WG2 #59, Oct. 2007, XP-002580785.
LG Electronics Inc., "PDCP Retransmissions," R2-073041, 3GPP TSG-RAN WG2 #59, Aug. 2007, XP-050135778.
LG Electronics Inc., "PDCP Structure and Traffic Path," R2-073259, 3GPP TSG-RAN WG2 #59, Aug. 2007, XP-050135985.
Bosch, "Header Compression Signaling," TSGR2#9(99)i32, TSG-RAN Working Group 2 (Radio Layer 2 and Radio Layer 3), Nov. 29, 1999, XP-050114120.
3rd Generation Partnership Project (3GPP), "Packet Data Convergence Protocol (PDCP) Specification," Technical Specification, 3GPP TS 25.323, V.7.4.0, Mar. 2007, XP-050367856.
ASUSTeK, "Granularity Consideration for Variable RLC PDU Sizes," R2-070336, 3GPP TSG-RAN WG2 Meeting #56bis, Jan. 15, 2007, XP-050133423.
3rd Generation Partnership Project (3GPP), "Medium Access Control (MAC) Protocol Specification," Technical Specification, 3GPP TS 25.321, V.7.4.0, Mar. 2007, XP-050367709.
Gao, Y., et al., "Research on the Access Network and MAC Technique for Beyond 3G Systems," IEEE Wireless Communications, vol. 14, No. 2, pp. 57-61, Apr. 2007.
Nokia, "Active Mode DRX," 3GPP TSG-RAN WG2 Meeting #55, R2-062752, Oct. 2006, XP002437990.
NTT Docomo Inc, "Views on DRX/DTX control in LTE," 3GPP TSG RAN WG2 #56, R2-063397, Nov. 2006, XP050132870.
Email Rapporteur (Nokia), "DRX in E-UTRAN", 3GPP TSG-RAN WG2 Meeting #57, R2-070463, Feb. 2007, XP050133530.
LG Electronics, "DRX Scheme", R2-070265, 3GPP TSG-RAN WG2 #56bis, Jan. 2007.
Nokia, "Discontinuous reception in CELL_FACH", R2-071403, 3GPP TSG-RAN WG2 Meeting #58, Mar. 2007.
Catt, "Non-synchronized access and C-RNTI allocation," R2-062933, 3GPP TSG-RAN WG2#55, Oct. 2006.
NTT Docomo, Inc., "E-mail Discussion on U-plane ciphering location for LTE", R2-071293, 3GPP TSG RAN WG2#57bis, Mar. 2007.
LG Electronics, "U-plane ciphering at MAC/Physical Layer", R2-071550, 3GPP TSG RAN WG2#57bis, Mar. 2007.
United States Patent and Trademark Office U.S. Appl. No. 12/602,762, Final Office Action dated Dec. 7, 2012, 11 pages.
Korean Intellectual Property Office Application Serial No. 10-2007-0012749, Notice of Allowance dated Jan. 18, 2013, 2 pages.
Samsung, "LTE Handover procedures, text proposal", R2-061338, 3GPP TSG-RAN3 Meeting #53, May 2006, 14 pages.
Samsung, "UL Timing Sync Procedure", R2-0601006, 3GPP TSG RAN2#52, Mar. 2006, 4 pages, XP-002434793.
European Patent Office Application Serial No. 07793615.1, Search Report dated Feb. 18, 2013, 7 pages.
QUALCOMM Europe, "Open issues in random access procedure", R2-063034, 3GPP TSG-RAN WG2 #55, Oct. 2006, 3 pages.
Taiwan Intellectual Property Office Application Serial No. 096140865, Search Report dated Feb. 6, 2013, 6 pages.
European Patent Office Application Serial No. 07833694.8, Search Report dated Mar. 1, 2013, 8 pages.
European Patent Office Application Serial No. 07833143.6, Search Report dated Mar. 5, 2013, 10 pages.
Samsung, "Contention resolution in aRACH," 3GPP TSG-RAN WG2 #57bis, R2-071386, Mar. 2007, 4 pages.
TD Tech, "Contention Resolution and Initial Random Access," 3GPP TSG-RAN WG2 #57, R2-070910, Feb. 2007, 7 pages.
IPWireless, "Initial Access Procedure and C-RNTI Allocation," 3GPP TSG RAN WG2 #56bis, R2-070301, Jan. 2007, 4 pages.
Ericsson, "Initial, Random Access and Identity Handling," TSG-RAN WG2 Meeting #51, Tdoc R2-060592, Feb. 2006, 7 pages.
European Patent Office Application Serial No. 07833692.2, Search Report dated May 7, 2013, 7 pages.
Zte, "MAC state transition," 3GPP TSG RAN WG2 #50, Tdoc R2-060064, Jan. 2006, 2 pages.
Email rapporteur (NEC), "Summary of email discussion on DRX control," 3GPP Draft RAN 2 #57bis, XP050602959, Mar. 2007, 34 pages (relevant pages: p. 3).
European Patent Office Application Serial No. 13164854.5, Search Report dated Jul. 16, 2013, 9 pages.
European Patent Office Application Serial No. 08753282.6, Search Report dated Jul. 26, 2013, 10 pages.
Nokia, "Active Mode DRX," 3GPP TSG-RAN WG2 Meeting #55, R2-062752, Oct. 2006, 3 pages.
European Patent Office Application Serial No. 13164857.8 Search Report dated Jul. 24, 2013, 7 pages.
United States Patent and Trademark Office U.S. Appl. No. 12/113,816, Office Action dated Aug. 2, 2013, 30 pages.
United States Patent and Trademark Office U.S. Appl. No. 12/113,816, Final Office Action dated May 6, 2013, 30 pages.
LG Electronics, "Initial access procedure," 3GPP TSG RAN WG2#Ad Hoc on LTE, R2-061986, Jun. 2006, 6 pages.
European Patent Office Application Serial No. 08753229.7, Search Report dated Nov. 26, 2013, 8 pages.
Ericsson, "Issues on DRX in LTE Active", R2-070797, 3GPP TSG-RAN WG2 Meeting #57, Feb. 2007, XP050133822, 4 pages.
Samsung, "DRX operations for connected mode UEs in LTE", Tdoc R2-063120, 3GPP TSG-RAN2 Meeting #56, Nov. 2006, XP050132629, 4 pages.
European Patent Office Application Serial No. 08753226.3, Search Report dated Nov. 25, 2013, 7 pages.
Nokia, et al., "UL reporting rate for DL quality measurements in CELL_FACH", R2-071404, 3GPP TSG-RAN WG2 Meeting #57bis, Mar. 2007, XP050134343, 4 pages.
Nokia, "RACH reporting", 24A000008, TSG-RAN WG2/WG4, Nov. 2000, 2 pages.
Ericsson, Enhanced Paging Procedure, Tdoc R2-070586, 3GPP TSG RAN WG2 #57, Feb. 2007, XP050133637, 6 pages.
European Patent Office Application Serial No. 08741576.6, Search Report dated Dec. 17, 2013, 8 pages.
United States Patent and Trademark Office U.S. Appl. No. 13/476,697, Office Action dated Feb. 10, 2014, 8 pages.
NTT DoCoMo, Inc., "Contention-based and Contention-free Access Procedures in LTE," 3GPP TSG-RAN WG2 #57, R2-070778, Feb. 2007, 3 pages.
IPWireless, et al., "RACH access optimisation," 3GPP TSG RAN WG2 #59, R2-073186, Jun. 2007, 6 pages.
Panasonic, "Timer handling for RACH procedures," 3GPP TSG RAN WG2 #61, R2-080873, Feb. 2008, 3 pages.

European Patent Office Application Serial No. 07833705.2, Search Report dated Sep. 3, 2013, 5 pages.
United States Patent and Trademark Office U.S. Appl. No. 12/113,816, Final Office Action dated Sep. 30, 2013, 20 pages.
Siemens, "ARQ operation and HARQ," 3GPP TSG-RAN WG2 #55, R2-062843, Oct. 2006, 4 pages.
European Patent Office Application Serial No. 08766418.1, Search Report dated Oct. 10, 2013, 7 pages.
NEC, "Fast setup for PS services (Cell PCH & URA PCH)," 3GPP TSG-RAN2 Meeting #53, Tdoc R2-061124, May 2006, 5 pages.
LG Electronics, "DRX Scheme," 3GPP TSG-RAN WG2 #56, R2-063248, Nov. 2006, 4 pages.
European Patent Office Application Serial No. 08766426.4, Search Report dated Nov. 25, 2013, 6 pages.
United States Patent and Trademark Office U.S. Appl. No. 13/342,691, Office Action dated Dec. 9, 2013, 8 pages.
LG Electronics Inc., "Scheduling Consideration on L2 Header," 3GPP TSG-RAN WG2 #58, R2-071887, May 2007, 3 pages.

* cited by examiner

*Primary Examiner* — Dang Ton
*Assistant Examiner* — Robert M Morlan (74) *Attorney, Agent, or Firm* — Lee, Hong, Degerman, Kang & Waimey (57) ABSTRACT

Disclosed is method of controlling handover of a user equipment in a first base station connected with the user equipment (UE) in a mobile communication system. The first base station transmits state information to a second base station after determining handover to the second base station, wherein the state information includes at least one of information related to a connection setup state between the user equipment (UE) and the first base station and information related to a data transmission and reception state. The first base station transmits action information to the user equipment (UE), the action information being related to action to be performed by the user equipment (UE) after the user equipment (UE) performs handover. The information related to the connection setup state includes information as to whether the user equipment (UE) is in an uplink synchronized state or an uplink non-synchronization state before performing handover.

19 Claims, 8 Drawing Sheets

METHOD OF PERFORMING HANDOVER AND CONTROLLING THEREOF IN A MOBILE COMMUNICATION SYSTEM

CROSS-REFERENCE TO RELATED APPLICATIONS

This application is the National Stage filing under 35 U.S.C. 371 of International Application No. PCT/KR2007/004011, filed on Aug. 22, 2007, which claims the benefit of earlier filing date and right of priority to Korean Application No. 10-2007-0081356, filed on Aug. 13, 2007, and also claims the benefit of U.S. Provisional Application Ser. Nos. 60/944,785, filed on Jun. 18, 2007, 60/915,666, filed on May 2, 2007, 60/915,417, filed on May 1, 2007, 60/915,042, filed on Apr. 30, 2007, 60/863,545, filed on Oct. 30, 2006, and 60/823,247, filed on Aug. 22, 2006.

TECHNICAL FIELD

The present invention relates to a mobile communication system, and more particularly, to a method of performing handover and controlling thereof in a mobile communication system.

BACKGROUND ART

In a mobile communication system, handover means a procedure that, when a user equipment (UE) of which call is connected with a base station is disconnected from a corresponding base station service area and moves to an adjacent base station service area, the user equipment is automatically synchronized with a new communication channel of the adjacent base station and continues to maintain communication. In a broadband wireless communication system which is characterized in data packet communication of large capacity, a handover scheme more efficient than the existing handover scheme is required considering limited communication resources.

Figure 1:
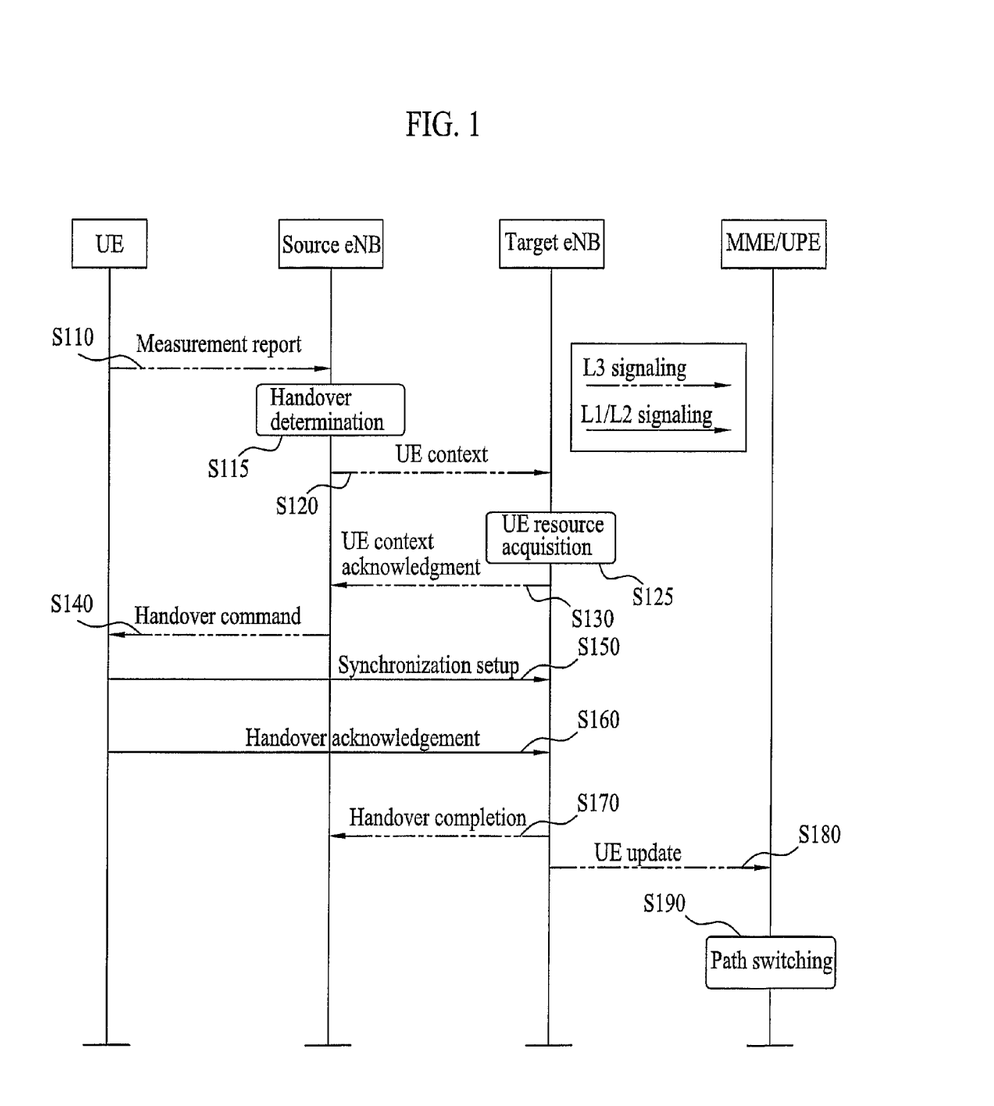
FIG. 1 is a flow chart illustrating a handover procedure in a mobile communication system according to the related art.

FIG. 1 is a flow chart illustrating a handover procedure in a mobile communication system according to the related art.

If a source base station (source eNB) is satisfied with a designated standard or a specific event occurs, a user equipment transmits a measurement report message to the source base station (S110). The source base station means a network node which is connected with the user equipment before handover is performed. The source base station determines handover if it is determined that handover is required referring to the measurement report message from the user equipment (S115).

The source base station transmits a handover preparation message to a target base station (target eNB), wherein the handover preparation message includes UE context information (S120). The target base station means a base station which controls a new cell to which the user equipment moves through handover. The UE context information includes information related to quality of service (QoS) received from the source base station to the user equipment, a radio bearer type, etc.

The target base station determines whether to allow a request of handover considering its wire and wireless resources. If the target base station determines to allow a request of handover, the target base station acquires resources for connection with the user equipment (S125), and forwards resource setup information of the user equipment to the source base station along with a new temporary identifier (C-RNTI) of the user equipment (S130).

The source base station transmits a handover command to the user equipment (S140), and starts to transmit user data to the target base station. The user equipment performs signaling of a first layer (Layer 1) and a second layer (Layer 2) to reset a wireless environment including timing synchronization with the target base station (S150). The user equipment receives timing information from the target base station and then transmits a handover acknowledgement message to the target base station (S160). The target base station transmits a handover completion message to the source base station to notify success of handover (S170). Afterwards, the source base station releases all resources of the user equipment. The target base station requests a core network (MME/UPE) to update a location of the user equipment (S180). The core network switches path setup of the user equipment to forward user data, which have been conventionally forwarded to the source base station, to the target base station (S190).

However, the aforementioned method of performing handover according to the related art does not consider a connection setup state between the user equipment and the source base station before handover is performed or a data transmission and reception state. For this reason, the user equipment may perform an unnecessary action after handover completions depending on the connection setup state with the source base station before handover is performed or the data transmission and reception state. In this case, a problem occurs in that the power of the user equipment may be used inefficiently.

DISCLOSURE OF THE INVENTION

Accordingly, the present invention is directed to a method of performing handover and controlling thereof in a mobile communication system, which substantially obviates one or more problems due to limitations and disadvantages of the related art.

An object of the present invention is to provide a method of performing handover and controlling thereof in a mobile communication system, in which a status of a user equipment before handover is considered when handover is performed in the mobile communication system.

Another object of the present invention is to provide a method of performing handover and controlling thereof in a mobile communication system, in which power efficiency of a user equipment is improved when handover is performed in the mobile communication system.

To achieve these objects and other advantages and in accordance with the purpose of the invention, as embodied and broadly described herein, a method of controlling handover of a user equipment in a first base station connected with the user equipment in a mobile communication system is disclosed. The first base station transmits state information to a second base station after determining handover to the second base station, wherein the state information includes at least one of information related to a connection setup state between the user equipment and the first base station and information related to a data transmission and reception state. The first base station transmits action information to the user equipment, the action information being related to an action to be performed by the user equipment after the user equipment performs handover. The information related to the connection setup state includes information as to whether the user equipment is in an uplink synchronized state or an uplink non-synchronized state before performing handover.

In another aspect of the present invention, a method of performing handover of a user equipment from a first cell to a second cell in a mobile communication system is disclosed.

The user equipment receives action information from a base station which controls the first cell or a base station which controls the second cell, the action information including information related to an action to be performed in the second cell by the user equipment after the user equipment performs handover. The user equipment performs action according to the action information in the second cell after the user equipment performs handover.

BRIEF DESCRIPTION OF THE DRAWINGS

FIGS. 4A and 4B illustrate a structure of a radio interface protocol between a user equipment (UE) and E-UTRAN, in which FIG. 4A is an architectural diagram of a control plane protocol and FIG. 4B is an architectural diagram of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described hereinafter are examples in which technical features of the present invention are applied to E-UMTS (Evolved Universal Mobile Telecommunications System).

Figure 2:
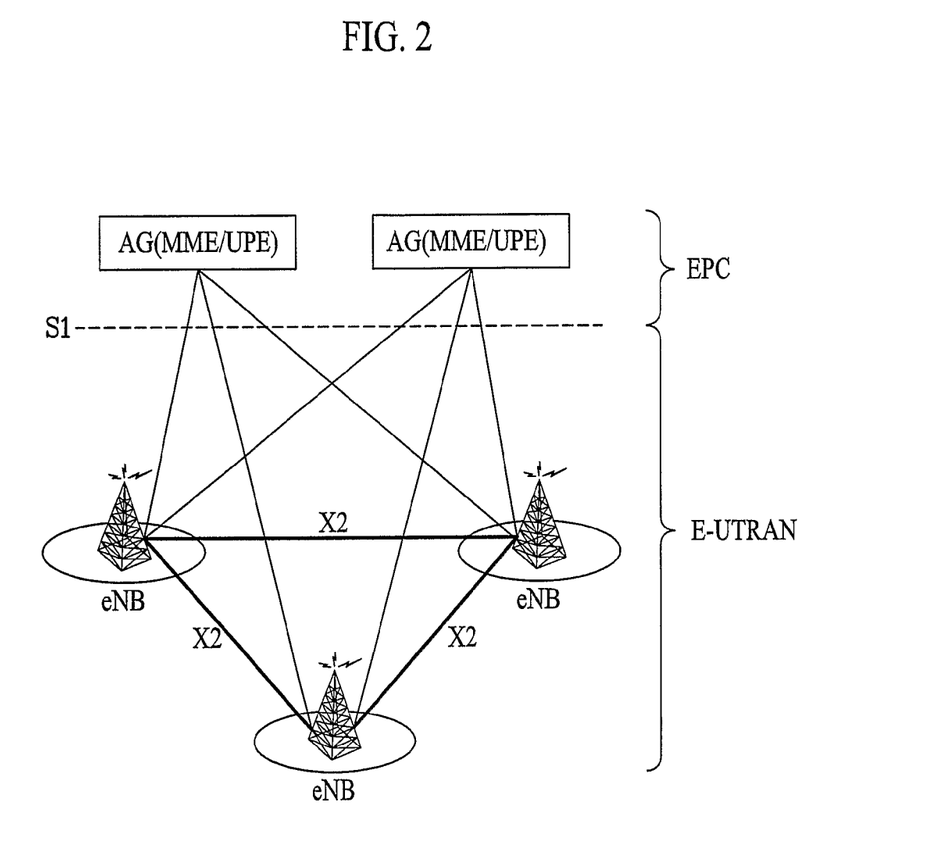
FIG. 2 illustrates a network structure of an E-UMTS (Evolved-Universal Mobile Telecommunications System)

FIG. 2 illustrates a network structure of an E-UMTS. An E-UMTS is a system evolving from the conventional WCDMA UMTS and its basic standardization is currently handled by the 3GPP ($3^{rd}$ Generation Partnership Project). The E-UMTS can also be called an LTE (Long Term Evolution) system. Release 7 and Release 8 of 3GPP technical specifications ($3^{rd}$ Generation Partnership Project; Technical Specification Group Radio Access Network) can be referred to obtain detailed information about the UMTS and E-UMTS.

Referring to FIG. 2, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface.

Layers of a radio interface protocol between a UE and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the UE and the network. For this, the RRC layer enables RRC messages to be exchanged between the UE and the network. The RRC layer can be distributively located at network nodes including Node B, an AG and the like or at either the Node B or the AG.

Figure 3:
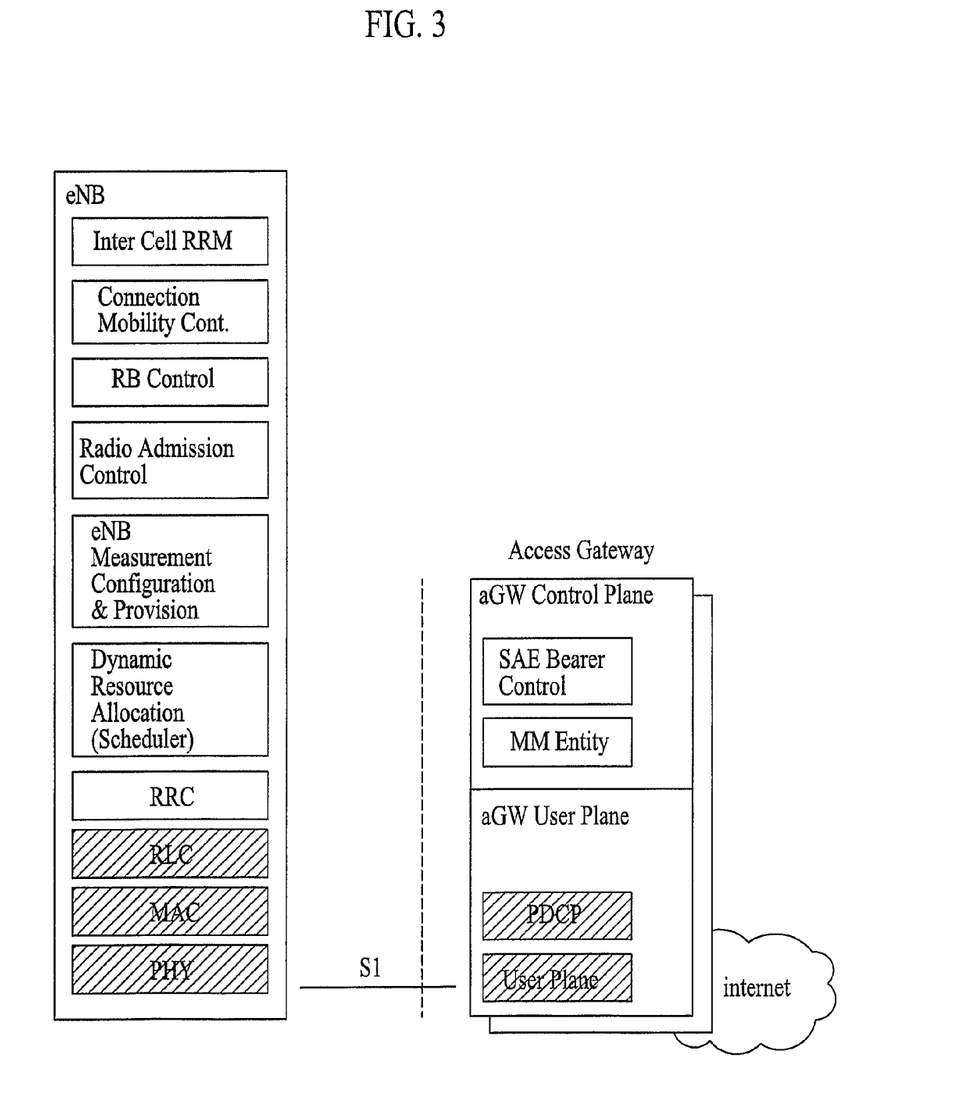
FIG. 3 is a schematic diagram illustrating an E-UTRAN (UMTS terrestrial radio access network)

FIG. 3 is a schematic view illustrating an E-UTRAN (UMTS terrestrial radio access network). In FIG. 3, a hatching part represents functional entities of a user plane and a non-hatching part represents functional entities of a control plane.

Figure 4A:
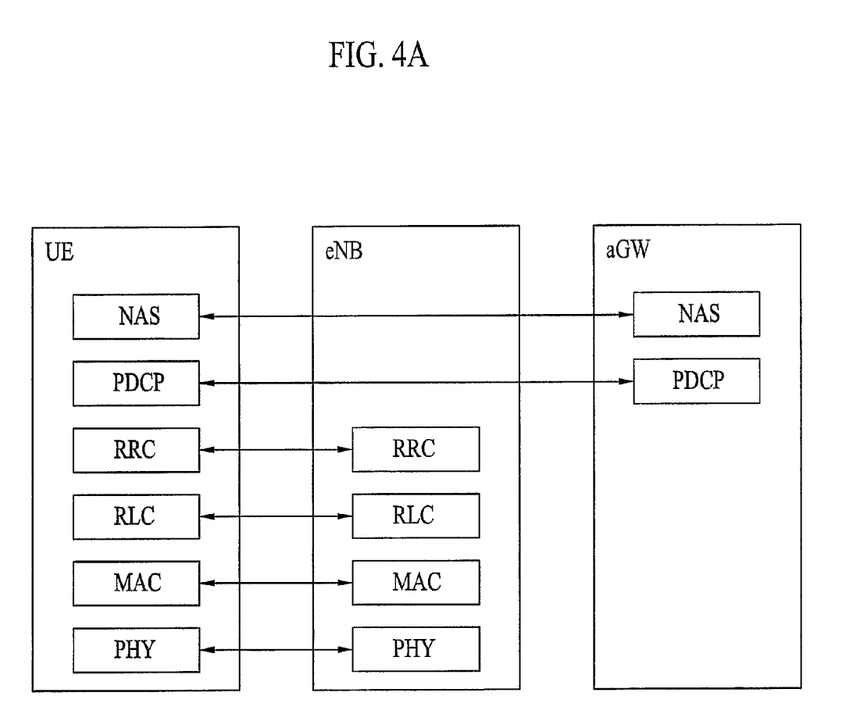
Figure 4B:
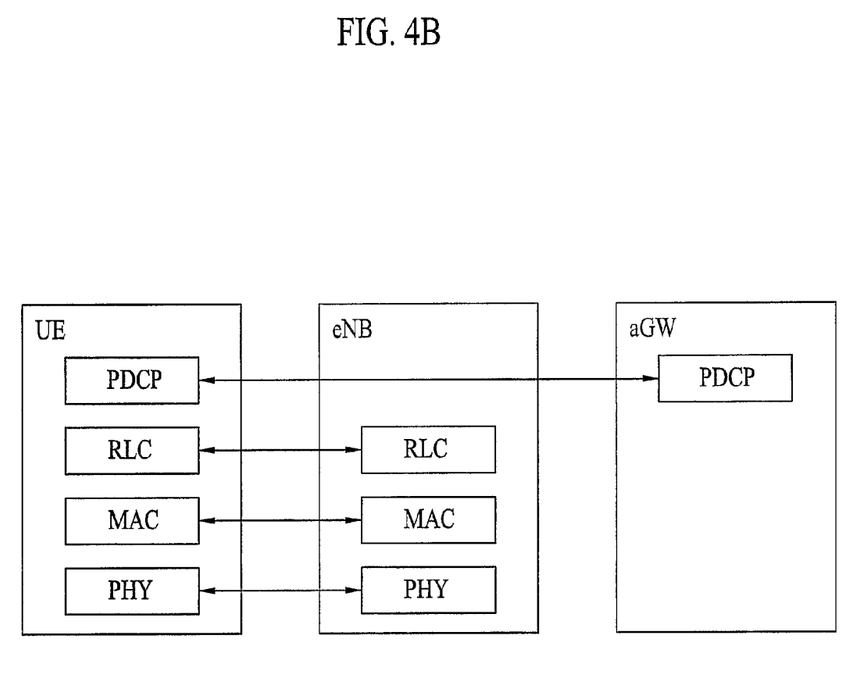

FIG. 4A and FIG. 4B illustrate a structure of a radio interface protocol between the user equipment (UE) and the E-UTRAN, in which FIG. 4A is a schematic view of a control plane protocol and FIG. 4B is a schematic view of a user plane protocol. Referring to FIG. 4A and FIG. 4B, a radio interface protocol vertically includes a physical layer, a data link layer, and a network layer and horizontally includes a user plane for data information transfer and a control plane for signaling transfer. The protocol layers in FIG. 4A and FIG. 4B can be classified into L1 (first layer), L2 (second layer), and L3 (third layer) based on three lower layers of the open system interconnection (OSI) standard model widely known in the communications systems.

The physical layer as the first layer provides information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated according to an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit IP packets (e.g., IPv4 or IPv6) within a radio-communication period having a narrow bandwidth, a PDCP layer of the second layer (L2) performs header compression to reduce the size of a relatively-large IP packet header containing unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the UE and the UTRAN.

As downlink transport channels carrying data from the network to UEs, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from UEs to the network, there are provided a random access channel (RACH) carrying an initial control message and an uplink shared channel (UL-SCH) carrying user traffic or control message.

As logical channels located above the transport channels and mapped with the transport channels, there are provided a broadcast channel (BCCH), a paging control channel (PCCH), a common control channel (CCCH), a multicast control channel (MCCH), and a multicast traffic channel (MTCH).

In the E-UMTS system, an OFDM is used on the downlink and a single carrier frequency division multiple access (SC-FDMA) on the uplink. The OFDM scheme using multiple carriers allocates resources by unit of multiple sub-carriers including a group of carriers and utilizes an orthogonal frequency division multiple access (OFDMA) as an access scheme.

A physical layer of an OFDM or OFDMA scheme divides active carriers into a plurality of groups and transmits respective groups to different receiving sides. Radio resource allocated to each UE which is defined by a time-frequency region on a two-dimensional sphere comprises continuous sub-carriers. A time-frequency region in the OFDM or OFDMA scheme is a rectangular form sectioned by time and sub-carrier coordinates. In other words, one time-frequency region could be a rectangular form sectioned by at least one symbol on a time axis and sub-carriers on a frequency axis. Such a time-frequency region can be allocated to an uplink for a specific UE, or an eNB can transmit the time-frequency region to a specific UE in a downlink. In order to define such a time-frequency region on the two-dimensional sphere, the number of OFDM symbols and the number of continuous sub-carriers starting from a point having an offset from a reference point should be given.

The E-UMTS which is currently being discussed uses 10 ms radio frame comprising 20 sub-frames. Namely, a sub-frame has a length of 0.5 ms. A resource block comprises one sub-frame and twelve sub-carriers, each of which is 15 kHz. One sub-frame comprises a plurality of OFDM symbols and a part (for example, first symbol) of the plurality of OFDM symbols can be used for transmission of L1/L2 control information.

Figure 5:
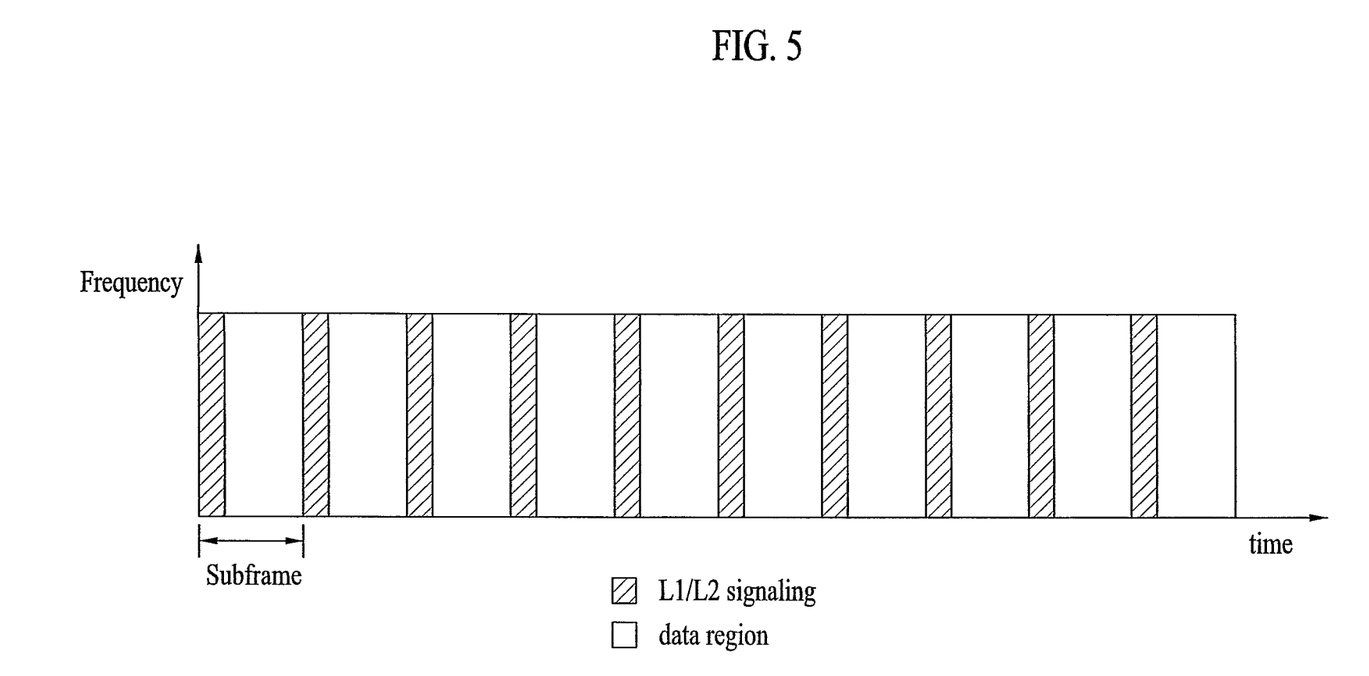
FIG. 5 illustrates an example of a structure of physical channels used in an E-UMTS system.

FIG. 5 is a diagram illustrating a structure of physical channels used in the E-UMTS. In FIG. 5, a sub-frame comprises an L1/L2 control information transmission region (the hatching part) and a data transmission region (the non-hatching part).

Meanwhile, paging means that a network calls one or more user equipments for some purpose. This paging function is to allow the network to find a specific user equipment in view of a basic aspect and to allow the user equipment to be in a sleeping mode if not necessary, thereby saving the power of the user equipment. In other words, the user equipment is in a sleeping mode at ordinary times and then wakes up, if paging is sent from the network, to take action required by the network.

To identify paging, the user equipment in a sleeping mode periodically wakes up to identify the presence of paging information sent to the user equipment. Periodical waking up of the user equipment means discontinuous reception (hereinafter, referred to as DRX). The E-UMTS (Universal Mobile Telecommunications system) which is an European IMT-2000 system uses the DRX as a method of receiving paging information of the user equipment. Structural elements for setting call between the user equipment and the system have been described as above.

Figure 6:
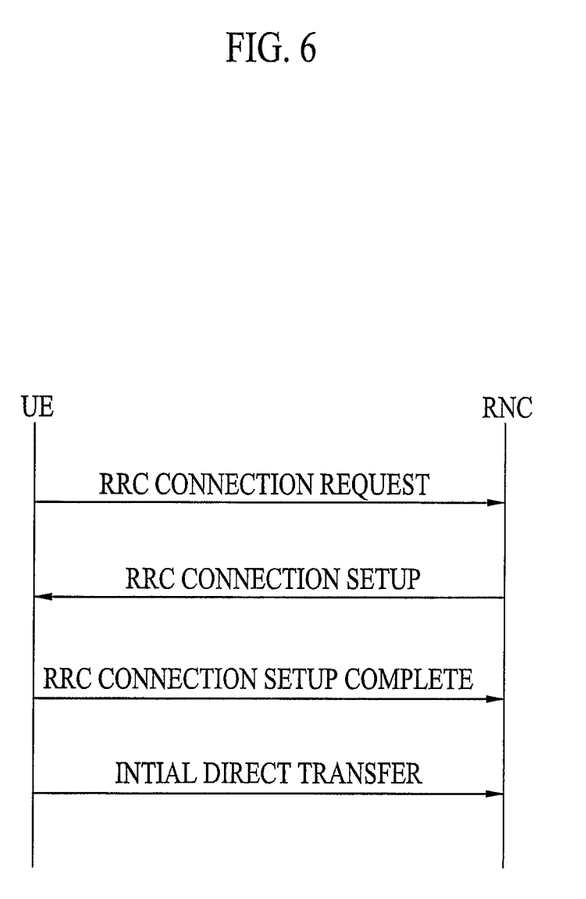
FIG. 6 is a flow chart illustrating RRC connection according to the preferred embodiment of the present invention.

FIG. 6 illustrates transmission of messages exchanged between a user equipment (UE) and a radio network controller (RNC) for RRC connection in the E-UTRAN system and initial direct transfer (IDT) message transmission for signal connection. In this case, the RNC is an apparatus which exists within a radio network subsystem (RNS), and serves to control integrity and use of radio resources. The RNS means an access part only in the E-UTRAN which provides allocation and release of radio resources for call setup means between the entire communication system or the user equipment and E-UTRAN.

To set up call with the UMTS system, the user equipment should perform RRC connection with the E-UTRAN, and perform signaling connection with CN. To this end, RRC state of the user equipment and RRC connection method will be described. The RRC state means whether RRC of the user equipment is logically connected with RRC of the E-UTRAN. The RRC state is called RRC connected state if the RRC of the user equipment is logically connected with the RRC of the E-UTRAN. On the other hand, the RRC state is called RRC idle state if not so. The E-UTRAN can identify the presence of the user equipment of the RRC connection state in a cell unit due to the presence of the RRC connection. Accordingly, the E-UTRAN can effectively control the user equipment. By contrast, the E-UTRAN cannot identify the user equipment of the RRC idle state, and a core network manages the user equipment of the idle state in a unit of a tracking area which is a local unit greater than the cell. In other words, in case of the user equipment of the RRC idle state, its presence is identified in a great local unit. The user equipment should move to the RRC connection state to obtain a typical mobile communication service such as voice or data. Hereinafter, the procedure of moving to the RRC connection state will be described in detail.

When a user first turns on the power of the user equipment, the user equipment searches a proper cell and then stays in the corresponding cell in the RRC idle state. The user equipment which stays in the RRC idle state performs RRC connection with the RRC of the E-UTRAN through an RRC connection procedure if the RRC connection is required, and transits to the RRC connection state. The user equipment which is in the RRC idle state needs the RRC connection in case of various examples. For example, the user equipment which is in the RRC idle state needs the RRC connection if uplink data transmission is needed due to trying calling of the user or if a response message transmission to a paging message received from the E-UTRAN is needed. The user equipment exchanges control information dedicated for the user equipment with the UTRAN or the CN through RRC connection and signaling connection. As shown in FIG. 6, as a first procedure for RRC connection, the user equipment transmits an RRC connection request message to the RNC.

Also, the RNC transmits an RRC connection setup message to the user equipment in response to the RRC connection request message. The user equipment transmits an RRC connection setup complete message to the RNC. If the aforementioned procedure successfully ends, the user equipment performs the RRC connection with the RNC. After the RRC connection is generated, the user equipment transmits IDT message to start the procedure of performing signaling connection.

Figure 7:
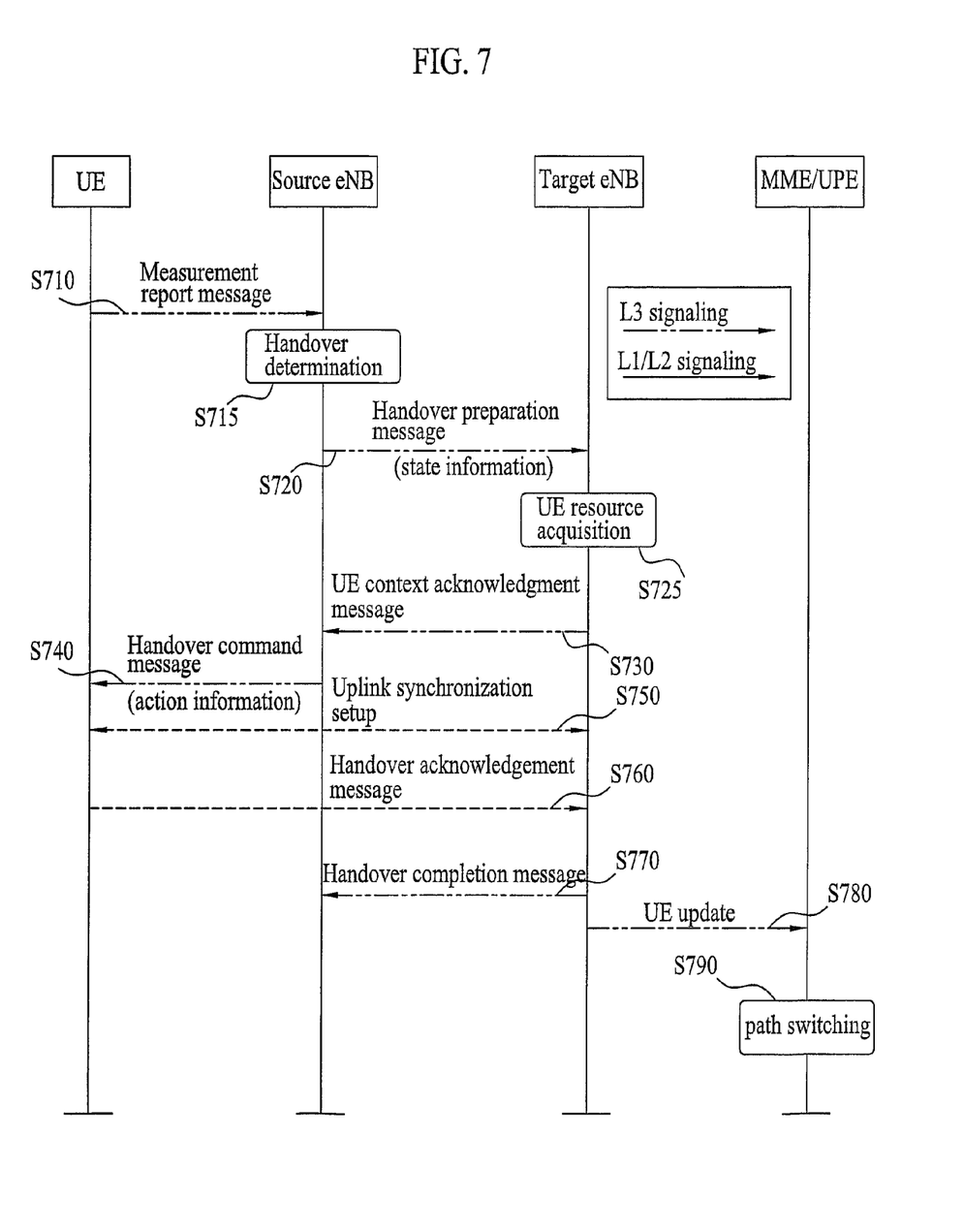
FIG. 7 illustrates a handover procedure of a user equipment according to the preferred embodiment of the present invention.

FIG. 7 illustrates a handover procedure of the user equipment according to the preferred embodiment of the present invention.

Referring to FIG. 7, if a certain standard is satisfied or a specific event occurs, the user equipment transmits a measurement report message to a source base station (S710). The source base station serves as a radio communication terminal with the user equipment and performs an RRC management function. The measurement report message includes information related to signal intensity from neighboring cells measured by the user equipment.

In the handover procedure of the user equipment according to the preferred embodiment of the present invention, during transmission of the measurement report message, the user equipment which is in a non-synchronized state can transmit a measurement result of cells depending on a size allowed by available radio resources. For example, if radio resources allocated from the source base station to the user equipment are 100 bits and 30 bits are required for information of one cell included in the measurement report message, the user equipment transmits the measurement result of three cells. Also, to increase a handover success rate of the user equipment, the user equipment which is in the non-synchronized state can report the measurement result of the cell having the largest signal among the cells measured by the user equipment when transmitting the measurement report message.

To transmit the measurement report message from the user equipment to the source base station, the user equipment should be synchronized with the source base station. If the user equipment is not synchronized with the source base station, the user equipment synchronizes with the source base station through a random access channel (RACH) in the E-UTRAN system. Hereinafter, the RACH will be described.

The RACH is used to transmit short data to an uplink, and some RRC messages such as RRC connection request message, cell update message, and URA update message can be transmitted through the RACH.

Furthermore, a common control channel (CCCH), a dedicated control channel (DCCH), or a dedicated traffic channel (DTCH), which is one of logical channels, can be mapped with the RACH which is one of transport channels. Furthermore, the RACH which is one of transport channels is again mapped with a physical random access channel (PRACH) which is one of physical channels. The PRACH which is an uplink physical channel is divided into a preamble part and a message part. The preamble part performs a power ramping function controlling a proper transmission power used for message transmission and a function of preventing collision among several user equipments. The preamble part may include uplink message information or channel measurement information to allow the source base station to perform resource allocation for uplink message transmission. The message part serves to transmit MAC PDU forwarded from MAC to a physical channel. A detailed RACH procedure will be described below.

MAC layer included in the user equipment commands a physical layer of the user equipment to perform PRACH transmission. Afterwards, the physical layer of the user equipment selects one access slot and one signature, and transmits PRACH preamble to the uplink depending on the selected result.

If the user equipment transmits the preamble, the base station transmits a response signal through an acquisition indicator channel (AICH) which is a downlink physical channel. The AICH transmitted in response to the preamble includes information of consent or rejection of the preamble transmission and signature transmitted from the user equipment, a temporary cell radio network temporary identifier (C-RNTI) allocated to the user equipment, and control information related to transmission of the RRC connection request message. The control information related to transmission of the RRC connection request message includes radio resource allocation information, message size, radio parameters (modulation and coding information, Hybrid ARQ information, etc.) for transmission of the RRC connection request message, and timing information.

Signaling information for receiving the random access response message is notified through L1/L2 control channel. The signaling information includes a random access radio network temporary identifier (RA-RNTI) which indicates transmission of the random access response message and transmission parameters related to transmission of the random access response message.

The source base station determines handover referring to the measurement report message from the user equipment if it is determined that handover is required (S715). The user equipment may determine handover and report it to the source base station depending on the system. If the source base station determines handover, the source base station transmits a handover preparation message to a target base station (target eNB) (S720). The handover preparation message includes UE context information and state information (S720). The state information includes at least one of information related to a connection setup state between the user equipment and the source base station and information related to a data transmission and reception state. The state information may be configured to be included in the UE context information. Alternatively, the state information may be forwarded to the target base station in a separate message type without being included in the handover message.

The information related to the connection setup state includes information indicating whether the user equipment is uplink-synchronized with the source base station. The uplink synchronized state will be described below.

As described above, OFDMA scheme is used for a physical channel in the E-UTRAN system. The OFDMA scheme divides a frequency band into bands of a certain size, and allocates each band to several user equipments. In this case, data reception may not be performed as data transmitted from each frequency band interfere with data transmitted from the other band. To avoid this, synchronization in transmission time between the respective user equipments is important in the OFDM. In other words, a user equipment 1 and a user equipment 2 are scheduled to transmit data in a specific time interval, an arrival time of transmission of the user equipment 1 to the base station should be coincident with an arrival time of transmission of the user equipment 2 to the base station. Data of the user equipments 1 and 2 cannot be recovered in the base station if there is a little difference between the arrival time of transmission of the user equipment 1 and the arrival time of transmission of the user equipment 2.

Accordingly, the E-UTRAN system is required to essentially perform synchronization in uplink channel transmission of each user equipment. To this end, several methods are used. One of them is to use the RACH. The user equipment which does not maintain synchronization in uplink channel with the base station transmits a bit stream, which is previously determined, i.e., signature, to the RACH, and the base station detects the signature. The base station calculates how transmission of the user equipment should be slowly or quickly performed for synchronization in uplink channel, based on the detected signal. The base station reports the calculated result to the user equipment. The user equipment controls its transmission time based on the calculated value and then performs uplink synchronization.

The information related to the data transmission and reception state of the user equipment includes active state or activity level information related to the data transmission and reception state of the user equipment. For example, the information related to the data transmission and reception state of the user equipment may include level information indicating whether data transmission and reception of the user equipment has not been performed for what time period or indicating a level of data transmission and reception activity of the user equipment. Also, the information related to the data transmission and reception state may include a current DRX level. Also, the transmission activity level information may include information as to how many times the user equipment performs transmission and whether data transmission and reception has not been performed for what time period, or information of the last transmission and reception time.

The data transmission and reception state information may includes a maximum value, a minimum value and an average value of a data transmission rate between the source base station and the user equipment, and a maximum value, a minimum value and an average value of a data transmission interval between the source base station and the user equipment. Also, the data transmission and reception state information may include a maximum value, a minimum value or an average value of a duty cycle or a duty factor in data transmission between the source base station and the user equipment. These values notify how many times data transmission and reception is performed for a certain time period.

The information related to the connection setup state includes information required to manage either the RRC connection state between the source base station and the user equipment or a synchronized state in an uplink direction of the user equipment. In other words, the information related to the connection setup state is required to control the RRC state or the synchronized state of the user equipment. Also, the information related to the connection setup state may include information indicating when transition of the RRC connection state between the target base station and the user equipment or transition of the synchronized state in an uplink direction of the user equipment should occur or preferably occurs as the case may be.

The data transmission and reception state information may include information as to how long time the source base station has not transmitted data to the user equipment or how long time the source base station has not received data from the user equipment. Also, the data transmission and reception state information may include information as to when the last data transmission to the user equipment or the last data reception from the user equipment has occurred.

The data transmission and reception state information may further include information of discontinuous reception parameter (DRX parameter) setup value set in the user equipment, a DRX parameter setup value used finally by the user equipment, and a plurality of DRX setup values set in the user equipment. The DRX setup value includes a period which the user equipment periodically receives a downlink channel, a DRX level of the user equipment, or a time which the user equipment stays in a DRX level.

Referring to FIG. 6 again, the target base station which has received the handover preparation message from the source base station determines whether to allow a handover request considering its wire and wireless resources. If it is possible to allow a handover request, the target base station acquires resources for connection with the user equipment (S725). The source base station forwards a UE context acknowledgement message, which includes resource setup information of the user equipment and information to be used by the user equipment in a new cell of the target base station, to the source base station along with a new C-RNTI (S730).

The UE context acknowledgement message may include action information related to action to be performed in a new cell after the user equipment completes handover. For example, the UE context acknowledgement message may include information as to whether uplink synchronization should be performed in a new cell after the user equipment completes handover. In other words, if the user equipment is not uplink-synchronized with the source base station before performing handover, uplink synchronization procedure is not needed in a new cell of the target base station after the user equipment completes handover. Accordingly, the target base station notifies the source base station that the uplink synchronization procedure is not needed after the user equipment completes handover. Since the uplink synchronization procedure is performed through the RACH, the UE context acknowledgement message may include information as to whether the RACH procedure should be performed in a new cell after the user equipment completes handover. Also, if the user equipment is synchronized with the source base station within a synchronization timer period, and if the user equipment has data to be transmitted to the target base station, since the data should be transmitted through the RACH procedure, the UE context acknowledgement message serves as information of the RACH procedure.

The UE context acknowledgement message may include information as to whether the user equipment should transmit the handover acknowledgement message to the target base station after completing handover. The user equipment should transmit the handover acknowledgement message to the source base station or the target base station if it performs handover. The user equipment can determine whether to transmit the handover acknowledgement message to which side depending on the information as to whether the user equipment should transmit the handover acknowledgement message. The UE context acknowledgement message may further include a DRX parameter setup value to be applied to a new cell by the user equipment. Also, the UE context acknowledgement message may further include a measurement related parameter to be performed in a new cell by the user equipment. In other words, since the user equipment is in an uplink non-synchronized state before performing handover, the user equipment can receive the measurement related parameter, which has received through the existing synchronization procedure, through the UE context acknowledgement message, if the user equipment is not synchronized with the target base station.

The source base station transmits a handover command message to the user equipment, wherein the handover command message includes at least a part of the UE context acknowledgement message (S740), and starts to transmit user data to the target base station. The handover command message includes action information related to action to be performed in a new cell by the user equipment after the user equipment completes handover. Whether the user equipment should perform specific action in a new cell after completing handover can be determined by the source base station or the target base station.

The user equipment performs action according to action information included in the handover command message in the new cell after completing handover. For example, if the action information commands that the user equipment should transmit or should not transmit the handover acknowledgement message to the target base station after completing handover, the user equipment moves to the new cell and transmits or does not transmit the handover acknowledgement message to the target base station depending on the command.

For another example, if the action information commands that the user equipment should perform or should not perform uplink synchronization procedure (or RACH procedure) after completing handover, the user equipment moves to the new cell and performs or does not perform the uplink synchronization procedure (or RACH procedure) depending on the command.

The above procedure suggested in the preferred embodiment of the present invention includes transmitting the handover acknowledgement message from the user equipment to the current cell before moving to the new cell in accordance with a handover command. Alternatively, the user equipment may not transmit the handover acknowledgement message to the current cell before moving to the new cell in accordance with the handover command.

If the uplink synchronization procedure is performed in the new cell after the user equipment completes handover, the user equipment performs signaling of a first layer (Layer 1) and a second layer (Layer 2) to reset a wireless environment including timing synchronization with the target base station (S750). If the action information commands that the user equipment should transmit the handover acknowledgement message from the new cell to the target base station, the user equipment transmits the handover acknowledgement message to the target base station after completing handover (S760). The target base station requests a core network (MME/UPE) to update a location of the user equipment (S780).

Afterwards, the core network switches a path setup of the user equipment to forward user data, which have been conventionally forwarded to the source base station, to the target base station (S790).

However, if the action information commands that the user equipment should not perform the uplink synchronization procedure in the new cell after completing handover, the user equipment does not need to perform the uplink synchronization procedure in the new cell (failure in S750). Also, if the action information commands that the user equipment should not transmit the handover acknowledgement message to the target base station after performing handover, the user equipment does not need to transmit the handover acknowledgement message to the target base station (failure in S760).

The target base station transmits a handover completion message to the source base station to notify success of handover (S770). Afterwards, the source base station releases all resources of the user equipment. The target base station requests the core network (MME/UPE) to update the location of the user equipment (S780). Afterwards, the core network switches path setup of the user equipment and transmits user data, which have been conventionally transmitted to the source base station, to the target base station (S790).

In the handover procedure according to the preferred embodiment of the present invention, if the user equipment moves to the new cell of the target base station, the user equipment can continue to use parameters used in the source base station. Examples of the parameters include a DRX setup value, a synchronization timer setup value, a non-synchronized state transition timer setup value, a periodic cell update timer setup value, and a periodic measurement report timer setup value.

The DRX setup value is used to allow the user equipment to perform DRX. The synchronization timer setup value is information of a timer value required to allow the user equipment to periodically perform a synchronization procedure. The non-synchronized state transition timer setup value is a value related to setting as to whether the user equipment is transited to a non-synchronized state depending on how long time passes after performing the synchronization procedure. The periodic cell update timer setup value is a setup value as to whether the user equipment should perform cell update at what time interval. The periodic measurement report timer setup value is a setup value as to whether the user equipment should transmit the measurement report message at what time interval.

In other words, if the user equipment has a DRX period of 1 second in the existing cell and sends 0.5 second of the DRX period directly before handover, the user equipment performs DRX for the other value of DRX, i.e., 0.5 second in a new cell.

In one preferred embodiment of the present invention, the source base station transmits the state information of the user equipment to the target base station, and the target base station determines action to be performed in a new cell by the user equipment after the user equipment completes handover, to forward the determined action to the user equipment through the source base station. In other words, the target base station determines whether to perform the synchronization procedure in a new cell, and the source base station serves to simply relay related information between the user equipment and the target base station.

In another preferred embodiment of the present invention, the source base station determines action to be performed in a new cell by the user equipment after the user equipment performs handover, and forwards the determined action to the user equipment. For example, the source base station determines whether to perform the uplink synchronization procedure (RACH procedure) and transmit the handover acknowledgement message, and transmits the determined action through a handover command.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to such a wireless communication system as a wireless internet system, a mobile communication system and the like.

The invention claimed is:

1. A method of performing a handover procedure at a source base station in a mobile communication system, the method comprising:
   transmitting, by the source base station, a first message to a target base station after a handover determination to the target base station is made;
   receiving, at the source base station, a second message, from the target base station, in response to the first message; and
   transmitting, by the source base station, a handover command message to a user equipment (UE) after the second message is received,
   wherein the first message includes data transmission and reception state information including a time duration while the UE has not transmitted data to the source base station or has not received data from the source base station before the handover,
   wherein the data transmission and reception state information further includes a discontinuous reception (DRX) parameter setup value used lastly by the UE and a plurality of DRX setup values set in the UE,
   wherein the first message is directly transmitted through an interface between the source base station and the target base station, and
   wherein the second message includes a UE identity and resource configuration information.

2. The method of claim 1, wherein the UE identity includes a Cell Radio Network Temporary Identifier (C-RNTI).

3. The method of claim 1, wherein the first message further includes a connection setup state between the UE and the source base station.

4. The method of claim 3, wherein the connection setup state includes an uplink synchronized state of the UE.

5. A base station configured to perform a handover procedure in a mobile communication system, the base station comprising:
- a transmitter configured to transmit a first message to a target base station after handover determination to the target base station is made; and
- a receiver configured to receive a second message, from the target base station, in response to the first message,
- wherein the transmitter is further configured to transmit a handover command message to a user equipment (UE) after the second message is received,
- wherein the first message includes data transmission and reception state information including a time duration when the UE has not transmitted data to the base station or has not received data from the base station before the handover,
- wherein the data transmission and reception state information further includes a discontinuous reception (DRX) parameter setup value used lastly by the UE and a plurality of DRX setup values set in the UE,
- wherein the transmitter is further configured to transmit directly the first message through an interface between the base station and the target base station, and
- wherein the second message includes a UE identity and resource configuration information.

6. The base station of claim 5, wherein the UE identity includes a Cell Radio Network Temporary Identifier (C-RNTI).

7. The base station of claim 5, wherein the first message further includes a connection setup state between the UE and the base station.

8. The base station of claim 7, wherein the connection setup state includes an uplink synchronized state of the UE.

9. A method of performing a handover procedure at a target base station in a mobile communication system, the method comprising:
- receiving, at the target base station, a first message from a source base station after a handover determination to the target base station is made;
- transmitting, by the target base station, a second message, to the source base station, in response to the first message; and
- receiving, at the target base station, a random access preamble from a user equipment (UE) according to resource configuration information,
- wherein the first message includes data transmission and reception state information including a time duration when the UE has not transmitted data to the source base station or has not received data from the source base station before the handover,
- wherein the data transmission and reception state information further includes a discontinuous reception (DRX) parameter setup value used lastly by the UE and a plurality of DRX setup values set in the UE,
- wherein the first message is directly received through an interface between the source base station and the target base station, and
- wherein the second message includes a user equipment (UE) identity and resource configuration information.

10. The method of claim 9, wherein the UE identity includes a Cell Radio Network Temporary Identifier (C-RNTI).

11. The method of claim 9, wherein the first message further includes a connection setup state between the UE and the source base station.

12. The method of claim 11, wherein the connection setup state includes an uplink synchronized state of the UE.

13. A base station configured to perform a handover procedure in a mobile communication system, the base station comprising:
- a receiver configured to receive a first message from a source base station after a handover determination to the base station is made; and
- a transmitter configured to transmit a second message, to the source base station, in response to the first message,
- wherein the first message includes data transmission and reception state information including a time duration when a UE has not transmitted data to the source base station or has not received data from the source base station before the handover,
- wherein the data transmission and reception state information further includes a discontinuous reception (DRX) parameter setup value used lastly by the UE and a plurality of DRX setup values set in the UE,
- wherein the receiver is further configured to receive directly the first message through an interface between the source base station and the base station,
- wherein the second message includes a user equipment (UE) identity and resource configuration information, and
- wherein the receiver is further configured to receive a random access preamble from the UE according to the resource configuration information.

14. The base station of claim 13, wherein the UE identity includes a Cell Radio Network Temporary Identifier (C-RNTI).

15. The base station of claim 13, wherein the first message further includes a connection setup state between the UE and the source base station.

16. The base station of claim 15, wherein the connection setup state includes an uplink synchronized state of the UE.

17. The method of claim 1, wherein the interface between the source base station and the target base station is a X2 interface.

18. The method of claim 1, wherein the DRX parameter setup value includes a period which the UE periodically receives a downlink channel, a DRX level of the UE, or a time which the UE stays in the DRX level.

19. The method of claim 9, wherein the DRX parameter setup value includes a period which the UE periodically receives a downlink channel, a DRX level of the UE, or a time which the UE stays in the DRX level.

* * * * *